United States Patent [19]

Akasu

[11] Patent Number: 4,483,293
[45] Date of Patent: Nov. 20, 1984

[54] IGNITION TIME CONTROL DEVICE
[75] Inventor: Masahira Akasu, Himeji, Japan
[73] Assignee: Mitsubishi Denki Kabushiki Kaisha, Tokyo, Japan
[21] Appl. No.: 481,941
[22] Filed: Apr. 4, 1983
[30] Foreign Application Priority Data
  Apr. 6, 1982 [JP] Japan .................................. 57-58689
  Jun. 14, 1982 [JP] Japan ................................ 57-103647
[51] Int. Cl.³ .............................................. F02P 5/00
[52] U.S. Cl. .................................. 123/414; 123/415; 123/630; 123/643
[58] Field of Search .............. 123/414, 415, 643, 630, 123/479

[56] References Cited
U.S. PATENT DOCUMENTS

| 4,104,997 | 8/1978 | Padgitt . | |
| 4,112,895 | 9/1978 | Habert | 123/414 |
| 4,216,755 | 8/1980 | Ordines | 123/643 |
| 4,250,846 | 2/1981 | Menard | 123/643 |
| 4,292,943 | 10/1981 | Kyogoku et al. . | |
| 4,378,004 | 3/1983 | Petrie | 123/414 |
| 4,378,771 | 4/1983 | Sawada et al. | 123/479 |

FOREIGN PATENT DOCUMENTS

WO81/00433  2/1981  PCT Int'l Appl. ................ 123/414

Primary Examiner—Parshotam S. Lall
Attorney, Agent, or Firm—Leydig, Voit, Osann, Mayer and Holt

[57] ABSTRACT

Described is an electronic ignition timing control device in which the low voltage distribution system is resorted to in place of the high voltage system making use of a distributor. There is provided angle sensor means the output of which is initiated at an angle advanced from the maximum ignition advance angle of each engine cylinder and terminated at the start-time ignition angle. The ignition time is controlled in terms of a lag from the angle advanced from the maximum ignition advance angle of each cylinder at which the angle sensor output is initiated.

9 Claims, 4 Drawing Figures

IGNITION TIME CONTROL DEVICE

BACKGROUND OF THE INVENTION

This invention relates to an ignition time control device for a multicylinder internal combustion engine.

Heretofore, a vacuum advancer or a centrifugal advancer enclosed in the distributor and connected mechanically with the engine has been used for ignition time control for this type of engine. However, in order to meet the increasing demand for reduction of fuel consumption and regulations against emission, such mechanical control is insufficient in point of precision and temporal changes of the components and electronic control is thought to be indispensable.

In such electronic control, it is customary to compute the optimum ignition time with the output signal from a reference position sensor in the distributor as one input and the output signal from a sensor sensing the operating conditions of the engine, such as negative pressure in the suction manifold, as another input and to interrupt the primary current of the ignition coil in accordance with the computed timing to control the ignition timing. In this instance, the high voltage induced in the secondary side of the ignition coil is distributed to each engine cylinder by the high voltage distributing system of the similar to a conventional system. Thus the distributor is still required for high voltage distribution, although the mechanical advancer is no longer required.

In order to obiate such problem, it has been proposed to control the ignition timing by a low voltage distributing system which replaces the high voltage system making use of the distributor.

SUMMARY OF THE INVENTION

This invention contemplates to provide an ignition control device of the low voltage distribution system which enables highly stable and accurate control in spite of its simple structure and design. According to the present invention, there are provided angle sensor means the output of which is initialed at an angle advanced from the maximum ignition advance angle of each cylinder and terminated at the start-time ignition angle, and at least one cylinder sensor operatively associated with each cylinder and delivering an output at each ignition, said cylinder sensor output being initiated at an angle advanced from the initiation of the angle sensor output and terminated at an angle retarded from the start-time ignition angle, the ignition time control being made in terms of the lag from the time of initiation of output of said angle sensor means.

DESCRIPTION OF THE PREFERRED EMBODIMENTS

Figure 1:
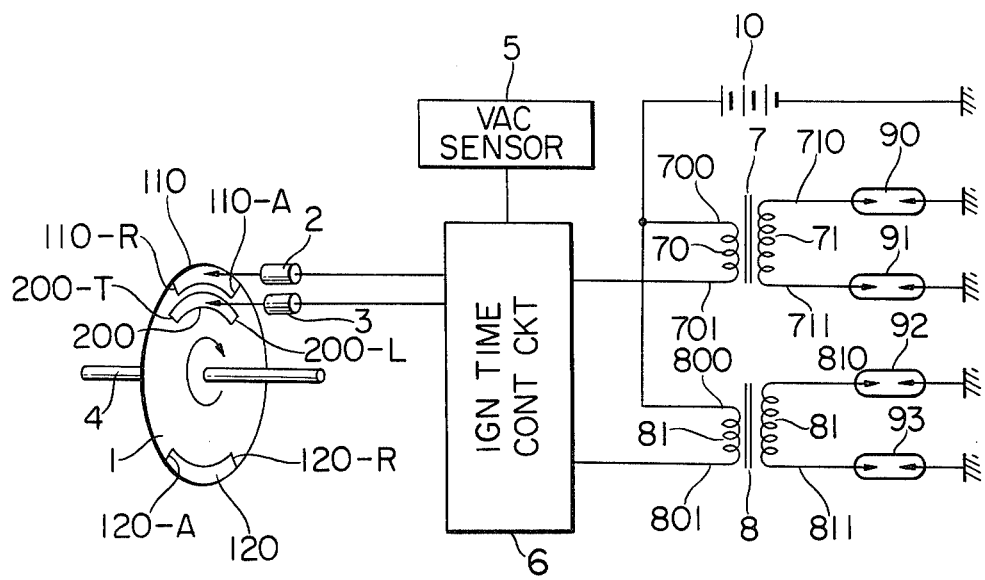
FIG. 1 is a schematic view showing the general arrangement of the first embodiment of the present invention.

Referring to FIG. 1 illustrative of the first embodiment of the invention, the numeral 1 designates a rotary disc fitted on a crankshaft 4 of a four-cylinder four-cycle engine, not shown. The disc 1 has slits 110, 120, 200 as shown.

An angle sensor 2 is mounted for sensing the light passing through the slits 110, 120 and producing pulse width outputs corresponding to the angular extent of the slits 110, 120 in timed relation with the rotation of the rotary disc 1.

A cylinder sensor 3 is also mounted on a plumb line drawn from the angle sensor 2 to the crankshaft 4. The cylinder sensor 3 is designed to sense the light passing through the slit 200 provided to the disc 1 similarly to the angle sensor 2, The numeral 5 designates a vacuum sensor for measuring the negative pressure prevailing in the suction manifold of the engine, not shown. The output signals from the negative pressure sensor 5, angle sensor 2 and the cylinder sensor 3 are introduced into an ignition time control circuit 6. The circuit 6 is designed to supply and interrupt the current at a proper timing to ignition coils 7, 8.

The ignition coil 7 has a primary winding 70 and a secondary winding 80, while the ignition coil 8 has a primary winding 71 and a secondary winding 81. The ends 700, 800 of the primary winding 70, 80 are connected to the non-grounded terminal of an electrical source 10, while the other ends 701, 801 thereof are connected to output terminals of the control circuit 6.

The output terminals 710, 711 of the secondary winding 71 of the ignition coil 7 are grounded via ignition plugs 90, 91, while the output terminals 810, 811 of the secondary winding 81 of the ignition coil 8 are similarly grounded via ignition plugs 92, 93. In FIG. 1, the numerals 200-T and 200-L designate the leading and trailing edges of the slit 200, respectively.

Figure 2:
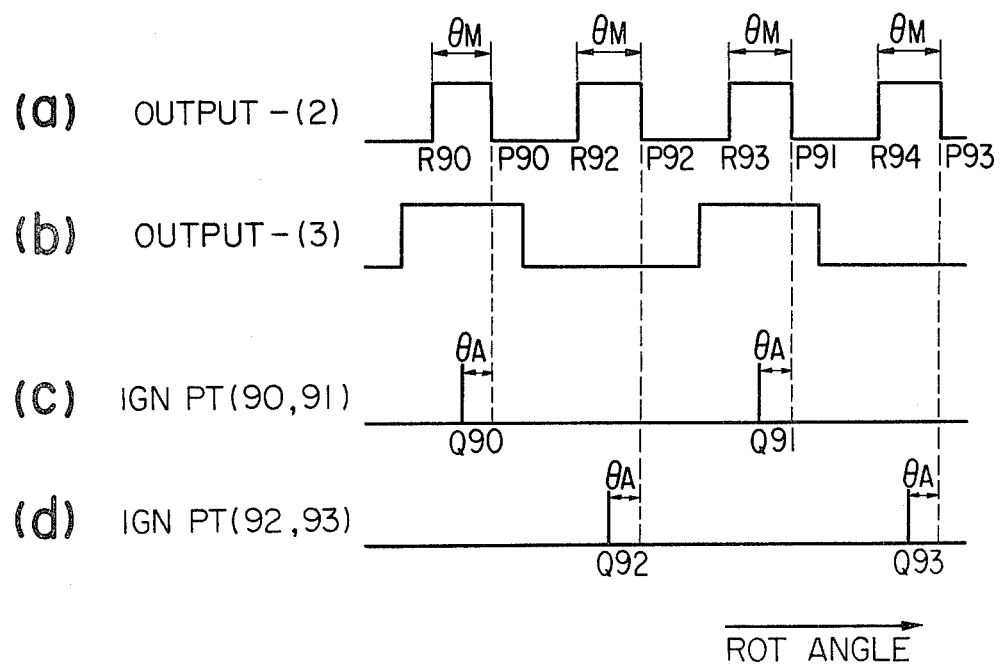
FIG. 2 is a diagram showing signal waveforms appearing at various portions of the device of FIG. 1.

The ignition time control device of the present invention operates as follows. In FIG. 1, it is assumed that the ignition sequence in terms of the plugs is 90-92-91-93. When the disc 1 is rotated in the arrow mark direction in FIG. 1, the waveforms of the electrical signals obtained from the angle sensor 2 and the cylinder sensor 3 are as shown in FIGS. 2 (a) and (b). As shown in FIG. 2(a) the angle sensor output signal pulses are initiated at each of points R90, R92, R91 and R93, and terminated at the start time ignition angles P90, P92, P91 and P93. Referring to FIG. 2(b), the cylinder sensor output signal pulses are initiated at an angle advanced from the initiation of the angle sensor output signal pulses and terminated at an angle retarded from the start time ignition angles (P90 or P91).

When the trailing edge 110-R of the slit 110 in the disc 1 and the trailing edge 120-R of the slit 120 in the disc 1 are set to the start time ignition point of each cylinder such as upper dead center point, the points P90, P91, P92, P93 in FIG. 2 register with upper dead center points of the cylinders associated with the ignition plugs 90, 91, 92, 93.

Thus, when the primary current of the ignition coil 7 is interrupted at point P90, an elevated voltage is induced in the secondary winding, so that ignition occurs in the associated cylinder by the operation of the ignition plug 90. An elevated voltage is also induced at this time in the ignition plug 91. However, the cylinder associated with the ignition plug 91 is in its exhaust stroke so that the pressure in the cylinder is low and the discharge occurs at a low voltage. Therefore, a majority of the electrical voltage induced in the secondary winding of the ignition plug 7 is applied to the ignition plug 90 and the energy necessary for ignition is applied to the plug 90. In FIG. 2, the reverse of the aforementioned process will occur at point P91.

Thus the point P91 corresponds to the upper dead center point of the cylinder associated with the ignition plug 91 and the majority of the elevated voltage induced in the secondary winding 71 of the ignition coil 70 is applied to the ignition plug 91.

The same may be said of the points P92, P93 in FIG. 2. Thus, when the cylinder sensor 3 is at a high output level, the primary current of the ignition coil 7 is interrupted by the trailing edge of the output signal of the angle sensor 2. When the cylinder sensor 3 is at a low output level, the primary current of the ignition coil 8 is interrupted by the trailing edge of the output signal of the angle sensor 2. In this manner, an elevated voltage is applied in the correct sequence to the ignition plugs 90 through 93.

In actual engines, the ignition time is not fixed to the start time ignition point as mentioned above, but the ignition need be controlled to take place at a proper timing depending on the engine operating conditions such as load and engine rpm's. In the embodiment shown in FIG. 1, the ignition control circuit 6 is used to this purpose.

Thus the circuit 6 operates to control the current supplied to the ignition coils 7, 8 based on the proper ignition points computed from input signals supplied thereto, namely the engine rpm signals obtained through measurement of the ignition timing signal periods from the angle sensor 2, and the signals from the sensor (the vacuum sensor 5 in FIG. 1) which senses the operating state of the engine.

Thus, ignition signals are produced at points Q90, Q92, Q91, Q93 that are temporarily ahead of the trailing edges P90, P92, P91, P93 of the signal waveforms from the angle sensor 2 shown in FIG. 2 (a) by an angle QA shown in FIGS. 2 (c), (d) so that the primary current of the primary coil 7 is interrupted when the cylinder sensor 3 is at a high output level, and the primary current of the primary coil 8 is interrupted when the cylinder sensor 3 is at a low output level as shown in FIG. 2(b).

Referring to FIG. 2, the angle QA is computed by the control circuit 6 and known as advance angle. In general, it is necessary to control the ignition time so as to be temporarily ahead of the start time ignition point. Since it is impossible to control the point Q91, for example, by referring to a point retarded with respect to the point Q91, such as P91, the point Q91 is usually controlled in terms of retard time or lag angle with respect to a point temporarily, ahead of the time point Q91, such as point P90 or P92.

In this case, the point Q91 is spaced apart from point P90 by 360° at the maximum and from point P92 by 180° in terms of the crankshaft angle. Therefore, the point Q91 is extremely difficult to control accurately.

This situation may be aggravated whenever the engine operation is not smooth and the ignition may occur at an abnormal angle in the event of sudden fluctuations in the rpm's resulting in engine stall or destruction in the extreme case.

It is also the aim of the present invention to obviate this deficiency. Referring to FIG. 1, the trailing edges 110-R, 120-R of the slits 110, 120 in the disc 1 are set to register with the start time ignition point, as mentioned hereinabove. However, the leading edges 110-A, 120-A of the slits 110, 120 are set to register with a point advanced a predetermined amount from the maximum advance angle as required by the engine. This makes it possible to obviate the aforementioned deficiency.

In FIG. 2(a), $\theta M$ represents an angle which is larger by a predetermined amount from the maximum advance angle. Thus, in the ignition timing control circuit 6, the ignition points Q90, Q91, Q92, Q93 may be controlled in terms of lag from the points R90, R92, R91, R93, respectively. In this manner, control accuracy may be improved drastically because the ignition time points are controlled at this time to be within a narrow range. Moreover, the advance angle in excess of a certain threshold value does not occur even in the case of sudden fluctuations in the rpm's because the ignition time points Q90, Q92, Q91, Q93 are not allowed to advance beyond the points R90, R92, R91, R93, respectively. This helps promote safe engine operation.

In addition, the ignition timing may be computed solely by angle sensor 2 and the distribution judged by the ignition timing control circuit based on the signal from the cylinder sensor 3. Thus any difference in the ignition timing from one cylinder to another may be counterbalanced by improving the accuracy of the angle sensor 2.

Moreover, precision in the output signal from the cylinder sensor 3 is not essential because the signal is not required in computing the ignition timing. In short, the angle sensor 2 and the cylinder sensor 3 may have broader freedom in construction in the designing of the low voltage distribution.

Figure 3:
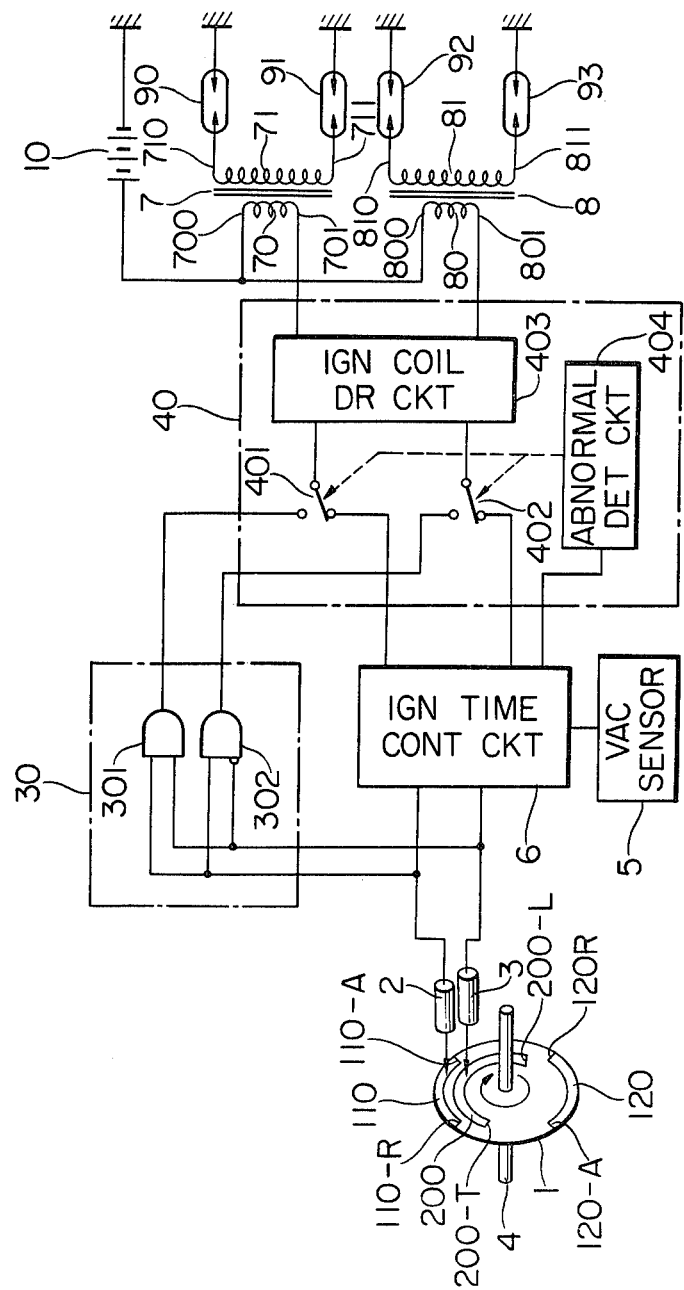
FIG. 3 is a schematic view showing the general arrangement of the second embodiment of the present invention.

FIG. 3 shows a third embodiment of the invention wherein the numerals 1, 2, 3, 4, 5, 6, 7, 8, 10, 70, 71, 80, 81, 90, 91, 92, 93, 110, 110-A, 110-R, 120, 120-A, 120-R, 200, 200-L and 20T are used to depict the same portions as those shown in FIG. 1. The numeral 30 designates a distributing circuit by means of which the output signal from the angle sensor 2 is divided into two signals through use of logic gates 301, 302 and based on the output signal from the cylinder sensor 3. The numeral 40 designates a switching selector by means of which the output signal from the distributing circuit 30 or the output signal computed in and supplied from the control circuit 6 and representative of the time interval the ignition coils 7, 8 remain energized, is selected for driving the ignition coils 7, 8. This switching selector 40 is made up of changeover switches 401, 402, a sensor circuit 404 for detecting abnormal conditions for controlling the changeover switches 401, 402 and an ignition coil driving circuit 403.

The operation of the second embodiment is now described mainly with reference to the distributing circuit 30 and the switching selector 40 which are not used in the embodiment shown in FIG. 1.

In order to control the ignition time of the engine to an optimum value under various running conditions, a microcomputer is used to compute the ignition timing to control the ignition coils. The result is the complex structure of the control circuit 6 and an increase in the number of times trouble occurs. In case a trouble should occur in the control circuit 6, it is no longer possible to compute the ignition timing accurately. The result is misfire or ignition at some unusual angle which may cause an engine stall or destruction in the extreme case.

The switching selector 40 is used in the present embodiment in order to obviate this inconvenience. In case of trouble in the control circuit 6, it is sensed by the sensor 404 in the switching selector, and the role so far played by the control circuit 6 in controlling the driving of the coils 7, 8 is transferred promptly to the distributing circuit 30. In other words, the changeover switches 401, 402 are shifted from the side of the control circuit 6 to the side of the distributing circuit 30.

Figure 4:
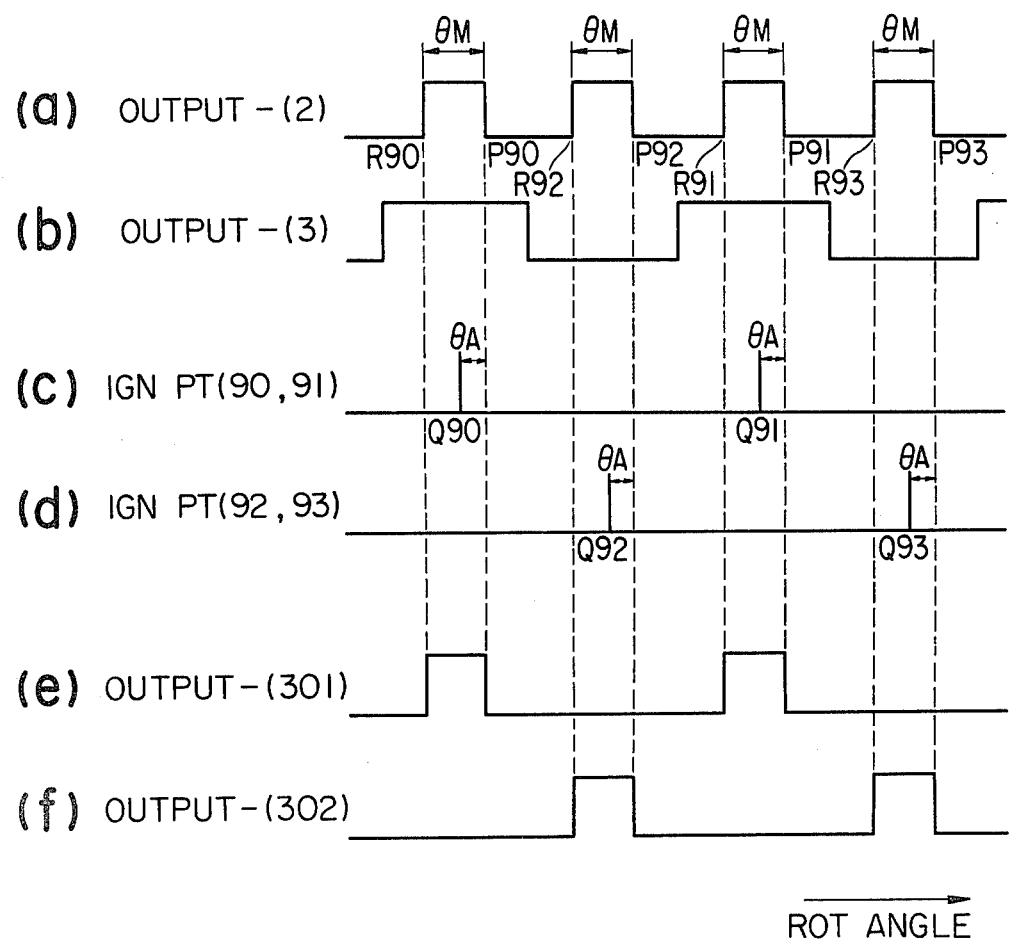
FIG. 4 is a diagram showing the signal waveforms appearing at various portions of the device shown in FIG. 3.

Since this time, the ignition coils 7, 8 are controlled by the output signals of the logic gates 301, 302 of the distributor 30 shown in FIGS. 4 (e), (f) FIGS. 4 (a) through (d) are same as FIGS. 2 (a) through (d) and therefore the description therefor is omitted for simplicity. The coil 7 starts to conduct current at point R90 or R91 and is ignited at points P90, P91. Simultaneously, the ignition coil 8 starts to conduct current at point R92, R93 and is ignited at point P92, P93. The ignition time is designed in this instance to register substantially with the trailing edge of the angle sensor output which is not necessarily the optimum ignition point of the engine. However, this is effective to prevent the occurrence of engine stall or destruction referred to hereinabove. In addition, the distributing circuit 30 and the switching selector 40 are constructed of extremely simple circuits such as logic gates and are free from troubles while being excellent in reliability.

In the embodiment of FIG. 3, the switching of the selector 40 is designed to occur responsive to the sensed abnormal state of the control circuit. However, the switching may be based on other signals or data. For instance, when the normal operation of the control circuit is not expected due to lowered battery potential, the switching selector 40 may be activated at lower than a predetermined potential to shift the driving control of the ignition coils 7, 8 to the distributing circuit 30 and to again shift the control to the control circuit upon recovery of the battery potential. A similar operation may be designed to take place during engine cranking so that the engine may be started positively in the cold climate by the cranking operation.

In the foregoing embodiment, a vacuum sensor is used for sensing the engine operating states. However, it is wholly within the scope of the invention to use other parameters to be introduced into the control circuit for controlling the ignition timing, such as signals supplied from cooling water temperature sensor, atmospheric pressure sensor or air temperature sensor.

In addition, the present invention is not limited to the four cylinders, but may be applied to six or eight cylinder engines provided that the number of cylinder sensors and that of the ignition coils are increased correspondingly. Thus, two cylinder sensors and three ignition coils may be used for a six cylinder engine, while three cylinder sensors and four ignition coils may be used for an eight cylinder engine for realizing a similar situation to the one described above for a four-cylinder engine.

What is claimed is:

1. An ignition time control device for a multicylinder internal combustion engine comprising angle sensor means providing an output which is initiated at an angle advanced from the maximum ignition advance angle of each engine cylinder and terminated at a start time ignition angle thereof; at least one cylinder sensor operatively associated with each engine cylinder and delivering an output at each ignition, said cylinder sensor output being initiated at an angle advanced from the angle sensor output and terminated at an angle retarded from a start time ignition angle; at least one sensor arranged for sensing the operating state of the engine; and an ignition timing control circuit operable to receive the outputs from said angle sensor means and said cylinder sensor for supplying and interrupting the current to ignition coil means at a suitable timing.

2. The device as claimed in claim 1 wherein the ignition timing is controlled in terms of the lag from an angle advanced from the maximum ignition advance angle of each cylinder at which the output is sensed by the angle sensor.

3. The device as claimed in claim 2 wherein a rotating disc rotated with the engine crankshaft is formed with slits for supplying signals to said angle sensor means and said cylinder sensor.

4. An ignition time control device for a multicylinder internal combustion engine comprising angle sensor means providing an output which is initiated at an angle advanced from the maximum ignition advance angle of each engine cylinder and terminated at a start time ignition angle thereof; at least one cylinder sensor operatively associated with each engine cylinder and delivering an output at each ignition, said engine sensor output being initiated at an angle advanced from the angle sensor output angle and terminated at an angle retarded from said start time ignition angle; an ignition time control circuit supplied with outputs of said angle sensor means and said cylinder sensor, a distributing circuit for distributing the output of said angle sensor means in accordance with the cylinder sensor output, and switching selector means for selectively controlling the driving of ignition coils associated with each cylinder in accordance with the output of said control circuit or the output of said distributing circuit.

5. The device as claimed in claim 4 wherein said switching selector means operates to switch the driving control of said ignition coils from the side of the control circuit to the side of the distributing circuit.

6. The device as claimed in claim 4 wherein said switching selector means operates to switch the driving control of the ignition coils to the side of said distributing circuit in case the source voltage is lower than a predetermined value.

7. The device as claimed in claim 4 wherein said switching selector means operates to switch the driving control of the ignition coils to the distributing circuit side during engine cranking.

8. The device as claimed in claim 4 wherein, when the driving control of the ignition coils is effected by the control circuit output, the ignition timing is controlled in terms of the lag from an angle advanced from the maximum ignition advance angle of each cylinder at which the output is sensed by the angle sensor means.

9. The device as claimed in claim 8 wherein a rotating disc rotated with the engine crankshaft is formed with slits for supplying signals to said angle sensor means and said cylinder sensor.

* * * * *